United States Patent
Zhao et al.

(10) Patent No.: US 12,486,204 B2
(45) Date of Patent: Dec. 2, 2025

(54) DEVICE AND METHOD FOR INDUSTRIALIZED CONTINUOUS AND SIMPLIFIED PREPARATION OF UREA-FORMALDEHYDE SLOW-RELEASE NITROGEN FERTILIZER OR UREA-FORMALDEHYDE-BASED SLOW- AND CONTROLLED-RELEASE MULTI-NUTRIENT FERTILIZER

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Guizhe Zhao, Taiyuan (CN); Mingshan Gong, Taiyuan (CN); Yaqing Liu, Taiyuan (CN); Yang Xiang, Taiyuan (CN)

(73) Assignees: NORTHEN UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 798 days.

(21) Appl. No.: 17/842,698

(22) Filed: Jun. 16, 2022

(65) Prior Publication Data
US 2022/0315499 A1 Oct. 6, 2022

(51) Int. Cl.
*C05C 9/00* (2006.01)
*C05C 9/02* (2006.01)
*C05G 5/12* (2020.01)

(52) U.S. Cl.
CPC ............... *C05C 9/005* (2013.01); *C05C 9/02* (2013.01); *C05G 5/12* (2020.02)

(58) Field of Classification Search
CPC .. C05C 9/005; C05C 9/02; C05G 5/12; C05G 3/40; Y02P 60/21; B01J 19/18; B01J 2/20; B01J 4/001; B01J 4/008; F26B 21/10
See application file for complete search history.

(56) References Cited

FOREIGN PATENT DOCUMENTS

| CN | 201574119 | * | 9/2010 |
| CN | 206736126 | U | 12/2017 |
| CN | 110483105 | A | 11/2019 |
| GB | 1047913 | * | 11/1966 |

* cited by examiner

*Primary Examiner* — Cephia D Toomer

(57) ABSTRACT

This disclosure relates to slow- and controlled-release fertilizers, and more particularly to a device and a method for industrialized continuous and simplified preparing a urea-formaldehyde slow-release nitrogen fertilizer or a urea-formaldehyde-based slow- and controlled-release multi-nutrient fertilizer. Hydroxymethylurea is produced through the reaction extrusion of urea and formaldehyde. Through the self-ploycondensation of the hydroxymethylurea or the copolymerization of the hydroxymethylurea and a modifier in a reactive extruder, the urea-formaldehyde slow-release nitrogen fertilizer or the urea-formaldehyde-based slow- and controlled-release multi-nutrient fertilizer is prepared.

12 Claims, 1 Drawing Sheet

DEVICE AND METHOD FOR INDUSTRIALIZED CONTINUOUS AND SIMPLIFIED PREPARATION OF UREA-FORMALDEHYDE SLOW-RELEASE NITROGEN FERTILIZER OR UREA-FORMALDEHYDE-BASED SLOW- AND CONTROLLED-RELEASE MULTI-NUTRIENT FERTILIZER

CROSS-REFERENCE TO RELATED APPLICATIONS

This application claims the benefit of priority from Chinese Patent Application No. 202210563736.4, filed on May 23, 2022. The content of the aforementioned application, including any intervening amendments thereto, is incorporated herein by reference.

TECHNICAL FIELD

The present application relates to slow- and controlled-release fertilizers (S-CRF), and more particularly to a device and a method for industrialized continuous and simplified preparation of a urea-formaldehyde slow-release nitrogen fertilizer or a urea-formaldehyde-based slow- and controlled-release multi-nutrient fertilizer.

BACKGROUND

Urea-formaldehyde fertilizer is a biodegradable polymer slow-release chemical fertilizer, which is the first to be successfully developed and commercialized. It can slowly degrade and gradually release nitrogen nutrients under the action of microorganisms, and shows a good fertilizer effect. Moreover, urea-formaldehyde fertilizer has the effects of promoting soil aggregate structure formation and improving soil permeability and crop root system penetration, and has become the most potential slow-release fertilizer variety.

At present, the method for producing urea-formaldehyde slow-release chemical fertilizer includes a dilute solution method and a concentrated solution method. In the dilute solution method, urea and formaldehyde react in the form of dilute solution to generate a urea-formaldehyde suspension, which is then separated by solid-liquid separation, dried, and crushed to prepare a product. Although the mother liquor can be recycled, the method still has a high production cost and is not conducive to popularization and application. In contrast, in the concentrated solution method, urea and formaldehyde react in the form of concentrated solution, and the reaction product is solidified into a product by directly adding a catalyst. The product obtained has high adhesion with the equipment, so it is difficult to be automatically discharged from the reactor, and thus the method is only used in the small batch production or even in a laboratory stage. To solve the above problems, a current method for preparing urea-formaldehyde fertilizer is to spray urea-formaldehyde pre-polymer slurry into other nitrogen and phosphate fertilizers by a slurry spraying granulation process to prepare the urea-formaldehyde-containing compound fertilizer. However, the ratio of the urea-formaldehyde component in the compound fertilizer prepared by the method is very low (the urea-formaldehyde mass fraction is less than 20% in the commercially available product), and the overall nutrient slow-release effect of the compound fertilizer is limited, resulting in that the slow-release effect of urea-formaldehyde is difficult to fully exert. Therefore, there is an urgent need to develop a simple and efficient device and method for continuously preparing a slow-release fertilizer based on urea-formaldehyde at a low cost and a high efficiency.

In addition, urea-formaldehyde, as a condensation polymer, has a long molecular chain and slow microbial degradation, resulting in a long slow-release period of the nitrogen nutrient. As a consequence, urea-formaldehyde is difficult to meet the nutrient requirements of crops in season growth when used alone. At present, the average molecular chain length of urea-formaldehyde is controlled mainly by adjusting the process parameters, such as the molar ratio of urea and formaldehyde, the pH value of the reaction system, the reaction temperature, and the reaction time, so as to regulate the nutrient slow-release performance of urea-formaldehyde. Furthermore, the nutrient accumulation release rate of urea-formaldehyde presents a typical inverted L shape, that is, the quick-acting nutrients are released quickly in the early period, and the slow-release nutrients are released slowly in the middle and later periods. Nevertheless, the adjustment of the reaction process parameters can only change the height of the inverted L-shaped curve, and cannot change the shape of the curve. Unfortunately, most crops have a lower nutrient requirement in the early growth stage, and a peak period of nutrient absorption is reached in the middle and later stages. Therefore, the problem that the nutrient release rate of urea-formaldehyde fertilizer does not match the crop growth nutrient requirements cannot be fundamentally solved by merely adjusting the reaction process parameters. Hence, the development of a method to regulate the nitrogen nutrient release rate of urea-formaldehyde is a key to the efficient utilization of urea-formaldehyde slow-release fertilizer.

In addition, urea-formaldehyde fertilizer contains only the nitrogen nutrient, has a single nutrient element, and cannot meet the nutrient requirements of crops such as phosphorus, potassium, and sulfur other than nitrogen.

SUMMARY

An object of this disclosure is to provide a device and a method for industrialized continuous and simplified preparation of a urea-formaldehyde slow-release nitrogen fertilizer or a urea-formaldehyde-based slow- and controlled-release multi-nutrient fertilizer to overcome the defects in the prior art.

The technical solutions of this application are described as follows.

In a first aspect, this application provides a device for industrialized continuous and simplified preparation of a urea-formaldehyde slow-release nitrogen fertilizer, comprising:

a solid material storage tank;

wherein a first metering belt is arranged below a discharge port of the solid material storage tank; a reaction kettle is arranged below a discharge end of the first metering belt; a feed port of the reaction kettle is connected to a first liquid material storage tank through a first pipeline and connected to a second liquid material storage tank through a second pipeline; a first metering pump is arranged on the first pipeline, and a second metering pump is arranged on the second pipeline; a discharge port of the reaction kettle is successively connected to an upper-stage reactive extruder, a lower-stage reactive extruder, a granulator, a dryer, a cooling machine, a sieving machine, and a packaging machine through a third pipeline; a third metering pump is arranged on the third pipeline between the reaction kettle and the upper-stage reactive extruder; a mechanical stirring device and a heating device are arranged inside the reaction kettle; and a control valve is provided at the discharge port of the reaction kettle; and the sieving machine is connected to a feeding assembly of the upper-stage reactive extruder through a fourth pipeline.

In a second aspect, this application provides a method for preparing a urea-formaldehyde slow-release nitrogen fertilizer by using the above-mentioned device, comprising:

(S1) feeding urea from the solid material storage tank to the reaction kettle through the first metering belt, pumping formaldehyde from the first liquid material storage tank to the reaction kettle through the first metering pump; and pumping potassium hydroxide solution from the second liquid material storage tank to the reaction kettle through the second metering pump to form a reaction system with a preset pH value, followed by a reaction at a preset temperature and a preset stirring speed to obtain a hydroxymethylurea solution;

(S2) opening the control valve arranged on the bottom of the reaction kettle; pumping the hydroxymethylurea solution obtained in step (S1) into the feeding assembly of the upper-stage reactive extruder through the third metering pump; and performing reactive extrusion at a preset temperature and a preset screw speed in the upper-stage reactive extruder to make hydroxymethylurea to undergo a self-polycondensation to produce urea-formaldehyde, so as to obtain a continuous urea-formaldehyde extrudate;

(S3) feeding the continuous urea-formaldehyde extrudate obtained in step (S2) to a feeding assembly of the lower-stage reactive extruder, followed by kneading at a preset temperature and a preset screw speed, and extrusion from a die of the lower-stage reactive extruder to obtain a continuous strip-shaped slow-release nitrogen fertilizer crude product;

(S4) cutting the continuous strip-shaped slow-release nitrogen fertilizer crude product obtained in step (S3) into cylindrical granules by using the granulator;

(S5) drying the cylindrical granules obtained in step (S4) by using the dryer to a preset water content to obtain dried cylindrical granules;

(S6) cooling the dried cylindrical granules obtained in step (S5) by using the cooling machine;

(S7) grading the cooled cylindrical granules obtained in step (S6) by using the sieving machine, wherein qualified cylindrical granules are fed to the packaging machine, and unqualified cylindrical granules are returned to the feeding assembly of the upper-stage reactive extruder to undergo an extrusion and granulation again; and (S8) packing the qualified cylindrical granules obtained in step (S7) by using the packaging machine to obtain the urea-formaldehyde slow-release nitrogen fertilizer.

In an embodiment, in step (S1), a molar ratio of urea to formaldehyde is (4.0-1.0):1; the potassium hydroxide solution is added such that the reaction system has a pH of 7-10; and the preset temperature is 20-80° C.

In an embodiment, in step (S2), the preset temperature of the upper-stage reactive extruder is 50-200° C., and the preset screw speed of the upper-stage reactive extruder is A r/min, and $0<A \leq 200$; and in step (S3), the preset temperature of the lower-stage reactive extruder is 20-200° C., and the preset screw speed of the lower-stage reactive extruder is B r/min, and $0<B \leq 200$.

In an embodiment, in step (S4), the cylindrical granules have a length of 3-10 mm and a diameter of 3-5 mm; and in step (S5), the drying is performed at 60-200° C.; and the preset water content is equal to or less than 5%.

In an embodiment, the qualified cylindrical granules are cylindrical granules with a size of 3 mm or more, and the unqualified cylindrical granules are cylindrical granules with a size smaller than 3 mm; the unqualified cylindrical granules are returned to the feeding assembly of the upper-stage reactive extruder to undergo an extrusion and granulation again, and the qualified cylindrical granules are fed to the packaging machine to be packed in 25 kg per bag.

In a third aspect, this application provides a device for industrialized continuous and simplified preparation of a urea-formaldehyde slow-release nitrogen fertilizer or a urea-formaldehyde-based slow- and controlled-release multi-nutrient fertilizer, comprising:

a first solid material storage tank; and
a second solid material storage tank;

wherein a first metering belt is arranged below a discharge port of the first solid material storage tank; a reaction kettle is arranged below the discharge end of the first metering belt; a feed port of the reaction kettle is connected to a first liquid material storage tank through a first pipeline and connected to a second liquid material storage tank through a second pipeline; a first metering pump is arranged on the first pipeline, and a second metering pump is arranged on the second pipeline; a second metering belt is arranged below a discharge port of the second solid material storage tank; a mixing tank is arranged below a discharge end of the second metering belt; a discharge port of the reaction kettle is connected to a feed port of the mixing tank through a third pipeline; a third metering pump is arranged on the third pipeline; a discharge port of the mixing tank is successively connected to an upper-stage reactive extruder, a lower-stage reactive extruder, a granulator, a dryer, a cooling machine, a sieving machine, and a packaging machine through a fourth pipeline; a fourth metering pump is arranged on the fourth pipeline between the mixing tank and the upper-stage reactive extruder; a first mechanical stirring device and a heating device are arranged inside the reaction kettle; a second mechanical stirring device is arranged inside the mixing tank; a first control valve is provided at the discharge port of the reaction kettle, and a second control valve is provided at the discharge port of the mixing tank; and the sieving machine is connected to the second solid material storage tank through a fifth pipeline.

In a fourth aspect, this application provides a method for industrialized continuous and simplified preparation of a urea-formaldehyde slow-release nitrogen fertilizer or a urea-formaldehyde-based slow- and controlled-release multi-nutrient fertilizer by using the above-mentioned device, comprising:

(S1) feeding urea from the first solid material storage tank to the reaction kettle through the first metering belt; pumping formaldehyde from the first liquid material storage tank to the reaction kettle through the first metering pump, and pumping potassium hydroxide solution from the second liquid material storage tank to the reaction kettle through the second metering pump to form a reaction system with a preset pH value, followed by a reaction at a preset temperature and a preset stirring speed to obtain a hydroxymethylurea solution;

(S2) opening the first control valve arranged on the bottom of the reaction kettle; pumping the hydroxymethylurea solution obtained in step (S1) to the mixing tank and feeding a modifier from the second solid material storage tank through the second metering belt to the mixing tank, followed by a uniform mixing at a preset stirring speed to obtain a reaction mixture;

(S3) pumping the reaction mixture obtained in step (S2) to a feeding assembly of the upper-stage reactive extruder through the third metering pump, followed by a reactive extrusion at a preset temperature and a preset screw speed to produce a continuous urea-formaldehyde/modifier copolymer extrudate;

(S4) feeding the continuous urea-formaldehyde/modifier copolymer extrudate obtained in step (S3) to a feeding assembly of the lower-stage reactive extruder, followed by kneading at a preset temperature and a preset rotation speed, and extrusion from a die of the lower-stage reactive extruder to obtain a continuous strip-shaped product;

(S5) cutting the continuous strip-shaped product obtained in step (S4) into cylindrical granules by using the granulator;

(S6) drying the cylindrical granules obtained in step (S5) by using the dryer to a preset water content to obtain dried cylindrical granules;

(S7) cooling the dried cylindrical granules obtained in step (S6) by using the cooling machine;

(S8) grading cooled cylindrical granules obtained in step (S7) by using the sieving machine, wherein qualified cylindrical granules are fed to the packaging machine, and unqualified cylindrical granules are returned to the second solid material storage tank to undergo an extrusion and granulation again; and (S9) packing the qualified cylindrical granules obtained in step (S8) by using the packaging machine to obtain the urea-formaldehyde slow-release nitrogen fertilizer or the urea-formaldehyde-based slow- and controlled-release multi-nutrient fertilizer.

In an embodiment, when the modifier in step (S2) is a natural polymer or a synthetic polymer capable of improving soil, the urea-formaldehyde slow-release nitrogen fertilizer is obtained; and when the modifier in step (S2) is a nutritious fertilizer, the urea-formaldehyde-based slow- and controlled-release multi-nutrient fertilizer is obtained, wherein the nutritious fertilizer is free of nitrogen or comprises nitrogen and other nutrient elements.

The specific principle of the method provided herein is described below.

The urea-formaldehyde slow-release nitrogen fertilizer or urea-formaldehyde-based slow- and controlled-release multi-nutrient fertilizer capable of accurately controlling the release rate of nitrogen or nutrients, which is composed of urea-formaldehyde or a copolymer of hydroxymethylurea and a modifier, is prepared through an industrialized continuous and simplified reaction extrusion process. Many reaction conditions, such as temperature, the molar ratio of urea and formaldehyde, pH, and reaction time, can affect the degree of polymerization of the prepared urea-formaldehyde. The degree of copolymerization of the modifier and the urea-formaldehyde affects the number of easily hydrolyzable groups in the copolymer and the crystallinity degree of urea-formaldehyde. By regulating the polymerization degree of the macromolecular chain of urea-formaldehyde, crystallinity, and the number of the easily-hydrolyzed groups, the accurate regulation with respect to the release rate of nutrients in the nitrogen slow-release fertilizer or the multi-nutrients slow-release fertilizer can be realized.

In an embodiment, the nutritious fertilizer is selected from the group consisting of a nitrogen fertilizer, a phosphate fertilizer, a potassium fertilizer, a secondary or micro-element fertilizer, and a combination thereof; the natural polymer is selected from the group consisting of starch, cellulose, chitosan, and a combination thereof; and the synthetic polymer is selected from the group consisting of polyacrylic acid, polyacrylamide, polyvinyl alcohol, and a combination thereof.

In an embodiment, in step (S1), a molar ratio of urea to formaldehyde is (4.0-1.0):1; the potassium hydroxide solution is added such that a reaction system in the reaction kettle has a pH of 7-10; and the preset temperature is 20-80° C.

In an embodiment, in step (S3), the preset temperature of the upper-stage reactive extruder is 50-200° C., and the preset screw speed of the upper-stage reactive extruder is A r/min, and $0 < A \leq 200$; and In step (S4), the preset temperature of the lower-stage reactive extruder is 20-200° C., and the preset screw speed of the lower-stage reactive extruder is B r/min, and $0 < B \leq 200$.

In an embodiment, in step (S5), the cylindrical granules have a length of 3-10 mm and a diameter of 3-5 mm; and in step (S6), the drying is performed at 60-200° C.; and the preset water content is equal to or less than 5%.

In an embodiment, the qualified cylindrical granules are cylindrical granules with a size of 3 mm or more, and the unqualified cylindrical granules are cylindrical granules with a size smaller than 3 mm; the unqualified cylindrical granules are returned to the feeding assembly of the second solid material storage tank to undergo a extrusion and granulation again, and the qualified cylindrical granules are fed to the packaging machine to be packed in 25 kg per bag.

Compared with the prior art, this application has the following beneficial effects.

(1) In the method provided herein, during the reactive extrusion process, through the self-polycondensation of the hydroxymethylurea or the co-polymerization of the hydroxymethylurea and the modifier, the accurate regulation with respect to the release rate of nutrients in the nitrogen slow-release fertilizer or the multi-nutrients slow-release fertilizer can be realized.

(2) The device provided herein is simple and efficient, and the preparation method provided herein is stable and easy to control. By using the device and method provided herein, the large-scale continuous mass production of the nitrogen slow-release fertilizer or the multi-nutrient slow-release fertilizer can be realized.

(3) The device and method provided herein have good transferability. That is, suitable modifiers can be selected according to the growth cycle of different crops to prepare the urea-formaldehyde slow-release nitrogen fertilizer or a urea-formaldehyde-based slow- and controlled-release multi-nutrient fertilizer matching the nutrient requirements during the whole growth cycle of crops by using the device and method provided in this application.

Figure 1:
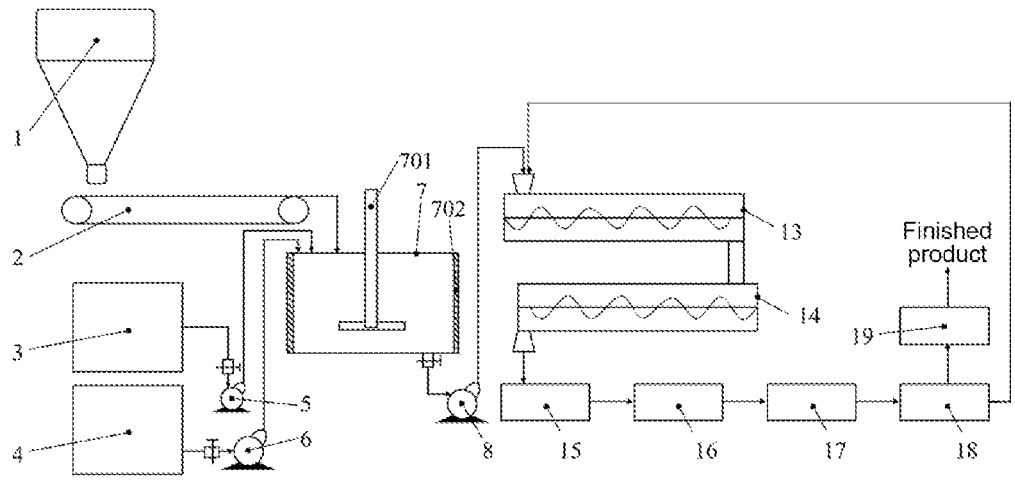
FIG. 1 schematically shows a structure of a device for industrialized continuous and simplified preparing a urea-formaldehyde slow-release nitrogen fertilizer according to Embodiment 1 of the present disclosure.
Figure 2:
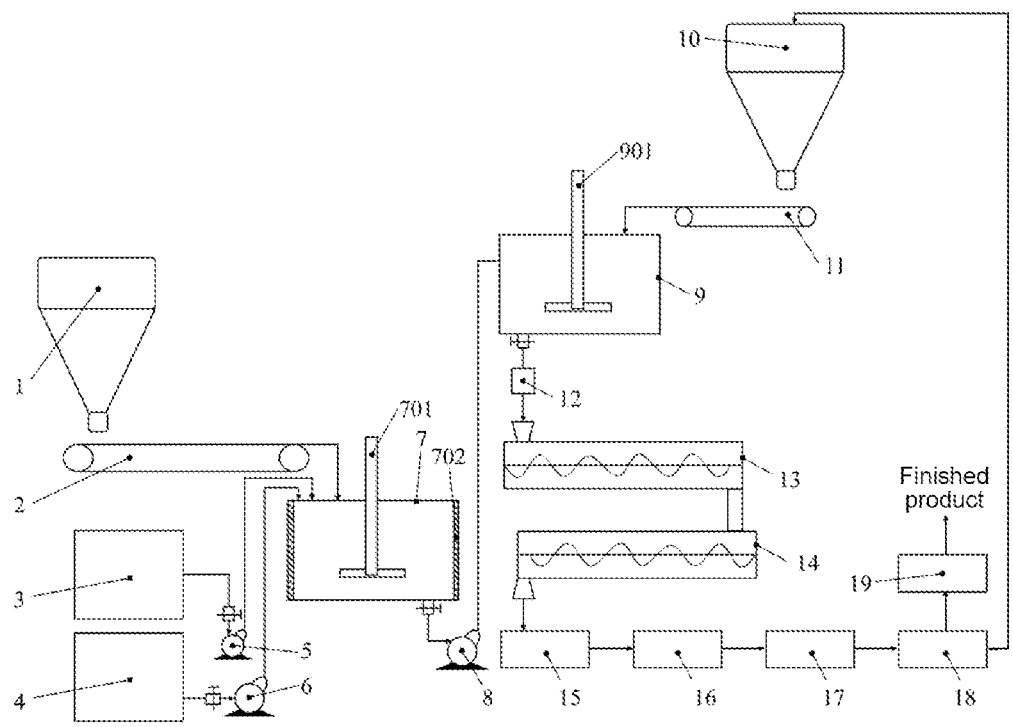
FIG. 2 schematically shows a structure of a device for industrialized continuous and simplified preparing a urea-formaldehyde-based slow- and controlled-release multi-nutrient fertilizer according to Embodiment 2 of the present disclosure.

In the drawings, 1, first solid material storage tank; 2, first metering belt; 3, first liquid material storage tank; 4, second liquid material storage tank; 5, first metering pump; 6, second metering pump; 7, reaction kettle; 701, first mechanical stirring device; 702, heating device; 8, third metering pump; 9, mixing tank; 901, second mechanical stirring device; 10, second solid material storage tank; 11, second metering belt; 12, fourth metering pump; 13, upper-stage reactive extruder; 14, lower-stage reactive extruder; 15, granulator; 16, dryer; 17, cooling machine; 18, sieving machine; and 19, packaging machine.

DETAILED DESCRIPTION OF EMBODIMENTS

The technical solutions of the present application will be clearly and completely described below with reference to the drawings and embodiments.

Embodiment 1

Provided herein is a device for industrialized continuous and simplified preparing a urea-formaldehyde slow-release nitrogen fertilizer, which includes a first solid material storage tank 1. A first metering belt 2 is arranged below a discharge port of the first solid material storage tank 1. A reaction kettle 7 is arranged below a discharge end of the first metering belt 2. A feed port of the reaction kettle 7 is connected to a first liquid material storage tank 3 through a first pipeline and connected to a second liquid material storage tank 4 through a second pipeline. A first metering pump 5 is arranged on the first pipeline, and a second metering pump 6 is arranged on the second pipeline. A discharge port of the reaction kettle 7 is successively connected to an upper-stage reactive extruder 13, a lower-stage reactive extruder 14, a granulator 15, a dryer 16, a cooling machine 17, a sieving machine 18, and a packaging machine 19 through a third pipeline. A third metering pump 8 is arranged on the third pipeline. A discharge port of the upper-stage reactive extruder 13 is connected to a feeding assembly of the lower-stage reactive extruder 14 through the third pipeline. A mechanical stirring device 701 and a heating device 702 are arranged inside the reaction kettle 7. A control valve is provided at the discharge port of the reaction kettle 7. The sieving machine 18 is connected to a feeding assembly of the upper-stage reactive extruder 13 through pipelines.

The reaction kettle 7 is configured to allow reaction of formaldehyde with urea to produce hydroxymethylurea.

The upper-stage reactive extruder 13 is configured to allow the hydroxymethylurea to suffer a self-polycondensation to produce the urea-formaldehyde and obtain a continuous urea-formaldehyde extrudate by reactive extrusion.

The upper-stage reactive extruder 13 is a horizontal double-screw self-cleaning reactive extruder.

The lower-stage reactive extruder 14 is configured to extrude the continuous urea-formaldehyde extrudate extruded by the upper-stage reactive extruder 13 into a continuous strip-shaped nitrogen slow-release fertilizer product.

The granulator 15 is configured to cut the continuous strip-shaped product into cylindrical granules.

The dryer 16 is configured to dry the cylindrical granules to obtain dried cylindrical granules with a specified water content.

The cooling machine 17 is configured to cool the dried cylindrical granules to obtain cooled cylindrical granules at a specified temperature.

The sieving machine 18 is configured to grade the cooled cylindrical granules, where qualified cylindrical granules are fed to the packaging machine 19, and unqualified cylindrical granules are returned to the feeding assembly of the upper-stage reactive extruder 13 to undergo an extrusion and granulation again.

The packaging machine 19 is configured to pack the qualified cylindrical granules.

Embodiment 2

Provided herein is a device for industrialized continuous and simplified preparation of a urea-formaldehyde-based slow- and controlled-release multi-nutrient fertilizer, which includes a first solid material storage tank 1 and a second solid material storage tank 10. A first metering belt 2 is arranged below a discharge port of the first solid material storage tank 1. A reaction kettle 7 is arranged below a discharge end of the first metering belt 2. A feed port of the reaction kettle 7 is connected to a first liquid material storage tank 3 through a first pipeline and connected to a second liquid material storage tank 4 through a second pipeline. A first metering pump 5 is arranged on the first pipeline, and a second metering pump 6 is arranged on the second pipeline. A second metering belt 11 is arranged below a discharge port of the second solid material storage tank 10. A mixing tank 9 is arranged below a discharge end of the second metering belt 11. A discharge port of the reaction kettle 7 is connected to a feed port of the mixing tank 9 through a third pipeline, and a third metering pump 8 is arranged on the third pipeline. The discharge port of the mixing tank 9 is successively connected to an upper-stage reactive extruder 13, a lower-stage reactive extruder 14, a granulator 15, a dryer 16, a cooler 17, a sieving machine 18, and a packaging machine 19 through a fourth pipeline. A fourth metering pump 12 is arranged between the mixing tank 9 and the upper-stage reactive extruder 13. The discharge port of the upper-stage reactive extruder 13 is connected to a feeding assembly of the lower-stage reactive extruder. A first mechanical stirring device 701 and a heating device 702 are arranged inside the reaction kettle 7. A second mechanical stirring device 901 is arranged inside the mixing tank 9. A first control valve is provided at the discharge port of the reaction kettle 7, and a second control valve is provided at the discharge port of the mixing tank 9. The sieving machine 18 is connected to the second solid material storage tank 10 through a fifth pipeline.

The reaction kettle 7 is configured to allow the reaction of formaldehyde and urea to produce hydroxymethylurea.

The mixing tank 9 is configured to uniformly mix the hydroxymethylurea and a modifier.

The upper-stage reactive extruder 13 is configured to allow a copolymerization between hydroxymethylurea and the modifier to produce a co-polymer by a reactive extrusion process.

The upper-stage reactive extruder 13 is a horizontal double-screw self-cleaning reactive extruder.

The lower-stage reactive extruder 14 is configured to extrude the blend extruded by the upper-stage reactive extruder 13 into a continuous strip-shaped product.

The granulator 15 is configured to cut the continuous strip-shaped product into cylindrical granules.

The dryer 16 is configured to dry the cylindrical granules to obtain dried cylindrical granules with a specified water content.

The cooling machine 17 is configured to cool the dried cylindrical granules to a specified temperature.

The sieving machine 18 is configured to grade the cylindrical granules, where the qualified cylindrical granules are fed to the packaging machine 19, and the unqualified cylindrical granules are re-fed to the second solid material storage tank 10 to undergo an extrusion and granulation again.

The packaging machine 19 is configured to pack the qualified cylindrical granules.

Example 1

Provided herein was a method for industrialized continuous and simplified preparation of a urea-formaldehyde slow-release nitrogen fertilizer by using the device in Embodiment 1, which included the following steps.

(S1) The reaction kettle 7 was added with 9600 g of urea from the first solid material storage tank 1 through the first metering belt 2, 10 L of formaldehyde from the first liquid material storage tank 3 through the first metering pump 5, and potassium hydroxide solution from the second liquid material storage tank 4 through the second metering pump 6 to make the reaction system with pH value of 8. Then the reaction system was reacted at 100° C. under the stirring speed of 300 r/min to obtain the hydroxymethylurea solution.

(S2) The control valve arranged on the bottom of the reaction kettle 7 was opened. After that, the hydroxymethylurea solution obtained in step (S1) was pumped into the feeding assembly of the upper-stage reactive extruder 13 to undergo the self-polycondensation in the upper-stage reactive extruder 13 to produce the urea-formaldehyde and obtain the continuous urea-formaldehyde extrudate by reactive extrusion, where the upper-stage reactive extruder 13 was set as 180° C., and the preset screw speed of the upper-stage reactive extruder 13 was 20 r/min.

(S3) The continuous urea-formaldehyde extrudate obtained in step (S2) was fed to the feeding assembly of the lower-stage reactive extruder 14 to undergo kneading and then extruded from the die of the lower-stage reactive extruder 14 to obtain the continuous strip-shaped slow-release nitrogen fertilizer crude product, where the lower-stage reactive extruder 14 was set as 25° C., and the preset screw speed of the lower-stage reactive extruder 14 was 20 r/min.

(S4) The continuous strip-shaped slow-release nitrogen fertilizer crude product obtained in step (S3) was cut into cylindrical granules by using the granulator 15.

(S5) The cylindrical granules obtained in step (S4) were dried at 100° C. by using the dryer 16 to obtain dried cylindrical granules with the water content of less than 2%.

(S6) The dried cylindrical granules obtained in step (S5) were cooled to below 50° C. by using the cooling machine 17.

(S7) The cooled cylindrical granules obtained in step (S6) were graded by using the sieving machine 18, where cylindrical granules with the size of 3 mm or more were defined as the qualified cylindrical granules, and cylindrical granules with a size smaller than 3 mm were defined as the unqualified cylindrical granules. The unqualified cylindrical granules were returned to the upper-stage reactive extruder 13 to undergo the extrusion and granulation process again, and the qualified cylindrical granules were fed to the packaging machine 19 to be packed.

(S8) The qualified cylindrical granules obtained in step (S7) were packed in 25 kg per bag by the packaging machine 19 to obtain the urea-formaldehyde slow-release nitrogen fertilizer.

The nitrogen content of the obtained urea-formaldehyde slow-release nitrogen fertilizer was 36.42%. In a pH-7 soil, the nitrogen cumulative release rate of the urea-formaldehyde slow-release nitrogen fertilizer was 38%, 45%, 53%, 60%, and 72% in 30 days, 60 days, 90 days, 120 days, and 150 days, respectively.

Example 2

Provided herein was a method for industrialized continuous and simplified preparation of a urea-formaldehyde slow-release nitrogen fertilizer by using the device in Embodiment 2, which included the following steps.

(S1) The reaction kettle 7 was added with 9600 g of urea from the first solid material storage tank 1 through the first metering belt 2, 10 L of formaldehyde from the first liquid material storage tank 3 through the first metering pump 5, and the potassium hydroxide solution from the second liquid material storage tank 4 through the second metering pump 6 to make the reaction system with pH value of 8. Then the reaction system was reacted at 80° C. under the stirring speed of 300 r/min to obtain the hydroxymethylurea solution.

(S2) The control valve arranged on the bottom of the reaction kettle 7 was opened. The hydroxymethylurea solution obtained in step (S1) was pumped into the mixing tank 9. After that, 1000 g of starch was added to the mixing tank 9 from the second solid material storage tank 10 through the second metering belt 11 to be mixed with the hydroxymethylurea solution in the mixing tank 9 to form a reaction mixture under the stirring speed of 100 r/min.

(S3) The reaction mixture obtained in step (S2) was continuously pumped into the feeding assembly of the upper-stage reactive extruder 13 to undergo reactive extrusion in the upper-stage reactive extruder 13 to produce the urea-formaldehyde/starch copolymer extrudate thereof, where the upper-stage reactive extruder 13 was set as 180° C., and the preset screw speed of the upper-stage reactive extruder 13 was 20 r/min.

(S4) The continuous extrudate obtained in step (S3) was fed to the feeding assembly of the lower-stage reactive extruder 14 to undergo kneading and then extruded from the die of the lower-stage reactive extruder 14 to obtain the continuous strip-shaped product, where the lower-stage reactive extruder 14 was set as 25° C., and the preset screw speed of the lower-stage reactive extruder 14 was 20 r/min.

(S5) The continuous strip-shaped product obtained in step (S4) was cut into cylindrical granules with a length of 10 mm and a diameter of 3 mm by using the granulator 15.

(S6) The cylindrical granules obtained in step (S5) were dried at 100° C. by using the dryer 16 to obtain dried cylindrical granules with the water content of less than 2%.

(S7) The dried cylindrical granules obtained in step (S6) were cooled to below 50° C. by using the cooling machine 17.

(S8) The cooled cylindrical granules obtained in step (S7) were graded by using the sieving machine 18, where cylindrical granules with the size of 3 mm or more were defined as the qualified cylindrical granules, and cylindrical granules with a size smaller than 3 mm were defined as the unqualified cylindrical granules. The unqualified cylindrical granules were returned to the second solid material storage tank 10 to undergo the extrusion and granulation process again, and the qualified cylindrical granules were fed to the packaging machine 19.

(S9) The qualified cylindrical granules obtained in step (S8) were packed in 25 kg per bag by the packaging machine 19 to obtain a nitrogen slow-release fertilizer finished product.

The obtained nitrogen slow-release fertilizer finished product herein had a nitrogen content of 28%, and a nitrogen cumulative release rate of 40%, 54%, 53%, 72%, and 84%, respectively, in 30 days, 60 days, 90 days, 120 days, and 150 days in a pH-7 soil, which was adapted to be used as a special fertilizer for corn.

Example 3

Provided herein was a method for industrialized continuous and simplified preparation of a urea-formaldehydebased slow- and controlled-release multi-nutrient fertilizer by using the device in Embodiment 2, which included the following steps.

(S1) The reaction kettle 7 was added with 9600 g of urea from the first solid material storage tank 1 through the first metering belt 2, 10 L of formaldehyde from the first liquid material storage tank 3 through the first metering pump 5, and potassium hydroxide solution from the second liquid material storage tank 4 through the second metering pump 6 to make the reaction system with pH value of 8. Then the reaction system was reacted at 80° C. under the rotating speed of 300 r/min to obtain the hydroxymethylurea solution.

(S2) The control valve arranged on the bottom of the reaction kettle 7 was opened. The hydroxymethylurea solution obtained in step (S1) was pumped into the mixing tank 9. After that, 10000 g of a modifier was added to the mixing tank 9 from the second solid material storage tank 10 through the second metering belt 11 to be mixed with the hydroxymethylurea solution in the mixing tank 9 to form the reaction mixture under the stirring speed of 100 r/min, where the modifier was composed of ammonium sulfate, superphosphate and potassium sulfate in the weight ratio of 2:1:1.

(S3) The reaction mixture obtained in step (S2) was continuously pumped into the feeding assembly of the upper-stage reactive extruder 13 to undergo reactive extrusion in the upper-stage reactive extruder 13 to produce the urea-formaldehyde/modifier blend and a continuous extrudate thereof, where the upper-stage reactive extruder 13 was set as 180° C., and the preset screw speed of the upper-stage reactive extruder 13 was 20 r/min.

(S4) The continuous extrudate obtained in step (S3) was fed to the feeding assembly of the lower-stage reactive extruder 14 to undergo kneading and then extruded from the die of the lower-stage reactive extruder 14 to obtain the continuous strip-shaped product, where the lower-stage reactive extruder 14 was set as 25° C., and the preset screw speed of the lower-stage reactive extruder 14 was 20 r/min.

(S5) The continuous strip-shaped product obtained in step (S4) was cut into cylindrical granules with a length of 10 mm and a diameter of 3 mm by using the granulator 15.

(S6) The cylindrical granules obtained in step (S5) were dried at 100° C. by using the dryer 16 to obtain dried cylindrical granules with the water content of less than 2%.

(S7) The dried cylindrical granules obtained in step (S6) were cooled to below 50° C. by using the cooling machine 17.

(S8) The cooled cylindrical granules obtained in step (S7) were graded by using the sieving machine 18, where cylindrical granules with the size of 3 mm or more were defined as the qualified cylindrical granules, and cylindrical granules with a size smaller than 3 mm were defined as the unqualified cylindrical granules. The unqualified cylindrical granules were returned to the second solid material storage tank 10 to undergo the extrusion and granulation again, and the qualified cylindrical granules were fed to the packaging machine 19.

(S9) The qualified cylindrical granules obtained in step (S8) were packed in 25 kg per bag by the packaging machine 19 to obtain the urea-formaldehyde-based slow- and controlled-release multi-nutrient fertilizer.

The obtained the urea-formaldehyde-based slow- and controlled-release multi-nutrient fertilizer herein had a nitrogen content of 28%, a phosphorus content of 5% and a potassium content of 9%. In a pH-7 soil, it showed a nitrogen cumulative release rate of 22%, a phosphorus cumulative release rate of 34%, and a potassium cumulative release rate of 54% in 30 days; a nitrogen cumulative release rate of 46%, a phosphorus cumulative release rate of 49%, and a potassium cumulative release rate of 66% in 60 days; a nitrogen cumulative release rate of 64%, a phosphorus cumulative release rate of 68%, and a potassium cumulative release rate of 74% in 90 days; a nitrogen cumulative release rate of 74%, a phosphorus cumulative release rate of 78%, and a potassium cumulative release rate of 82% in 120 days; a nitrogen cumulative release rate of 83%, a phosphorus cumulative release rate of 89%, and a potassium cumulative release rate of 91% in 150 days; and a nitrogen cumulative release rate of 94%, a phosphorus cumulative release rate of 98%, and a potassium cumulative release rate of 99% in 180 days, and was adapted to be used as a special fertilizer for wheat.

What is claimed is:

1. A method for industrialized continuous and simplified preparation of a urea-formaldehyde slow-release nitrogen fertilizer by using a device for industrialized continuous and simplified preparation of a urea-formaldehyde slow-release nitrogen fertilizer, the device comprising:

a solid material storage tank;
a first metering belt being arranged below a discharge port of the solid material storage tank; a reaction kettle being arranged below the discharge end of the first metering belt; a feed port of the reaction kettle being connected to a first liquid material storage tank through a first pipeline and connected to a second liquid material storage tank through a second pipeline; a first metering pump being arranged on the first pipeline, and a second metering pump being arranged on the second pipeline; a discharge port of the reaction kettle being successively connected to an upper-stage reactive extruder, a lower-stage reactive extruder, a granulator, a dryer, a cooling machine, a sieving machine, and a packaging machine through a third pipeline; a third metering pump being arranged on the third pipeline between the reaction kettle and the upper-stage reactive extruder; a mechanical stirring device and a heating device being arranged inside the reaction kettle; and a control valve being provided at the discharge port of the reaction kettle; and the sieving machine being connected to a feeding assembly of the upper-stage reactive extruder through a fourth pipeline; and the method comprising:

(S1) feeding urea from the solid material storage tank to the reaction kettle through the first metering belt; pumping formaldehyde from the first liquid material storage tank to the reaction kettle through the first metering pump, and pumping potassium hydroxide solution from the second liquid material storage tank to the reaction kettle through the second metering pump to form a reaction system with a preset pH value, followed by stirring to obtain a hydroxymethylurea solution;

(S2) opening the control valve arranged on the bottom of the reaction kettle; pumping the hydroxymethylurea solution obtained in step (S1) into the feeding assembly of the upper-stage reactive extruder through the third metering pump; and performing reactive extrusion in the upper-stage reactive extruder to allow hydroxymethylurea to undergo a self-polycondensation to produce urea-formaldehyde, so as to obtain a continuous urea-formaldehyde extrudate;

(S3) feeding the continuous urea-formaldehyde extrudate obtained in step (S2) to a feeding assembly of the lower-stage reactive extruder, followed by kneading and extrusion from a die of the lower-stage reactive extruder to obtain a continuous strip-shaped slow-release nitrogen fertilizer crude product;

(S4) cutting the continuous strip-shaped slow-release nitrogen fertilizer crude product obtained in step (S3) into cylindrical granules by using the granulator;

(S5) drying the cylindrical granules obtained in step (S4) by using the dryer to obtain dried cylindrical granules;

(S6) cooling the dried cylindrical granules obtained in step (S5) by using the cooling machine;

(S7) grading cooled cylindrical granules obtained in step (S6) by using the sieving machine, wherein qualified cylindrical granules are fed to the packaging machine, and unqualified cylindrical granules are returned to the feeding assembly of the upper-stage reactive extruder to undergo an extrusion and granulation process again; and (S8) packing the qualified cylindrical granules obtained in step (S7) by using the packaging machine to obtain the urea-formaldehyde slow-release nitrogen fertilizer.

2. The method of claim 1, wherein in step (S1), a molar ratio of urea to formaldehyde is (4.0-1.0):1; the potassium hydroxide solution is added such that the reaction system has a pH of 7-10; and the stirring is performed at 20-80° C.

3. The method of claim 1, wherein in step (S2), a preset temperature of the upper-stage reactive extruder is 50-200° C., and a preset screw speed of the upper-stage reactive extruder is A r/min, and 0<A≤200; and in step (S3), a preset temperature of the lower-stage reactive extruder is 20-200° C., and a preset screw speed of the lower-stage reactive extruder is B r/min, and 0<B≤200.

4. The method of claim 1, wherein in step (S4), the cylindrical granules have a length of 3-10 mm and a diameter of 3-5 mm; and in step (S5), the drying is performed at 60-200° C.; and the drying is performed to reach a preset water content equal to or less than 5%.

5. A device for industrialized continuous and simplified preparation of a urea-formaldehyde slow-release nitrogen fertilizer or a urea-formaldehyde-based slow-and controlled-release multi-nutrient fertilizer, comprising:

a first solid material storage tank; and a second solid material storage tank;

wherein a first metering belt is arranged below a discharge port of the first solid material storage tank; a reaction kettle is arranged below the discharge end of the first metering belt; a feed port of the reaction kettle is connected to a first liquid material storage tank through a first pipeline and connected to a second liquid material storage tank through a second pipeline; a first metering pump is arranged on the first pipeline, and a second metering pump is arranged on the second pipeline; a second metering belt is arranged below a discharge port of the second solid material storage tank; a mixing tank is arranged below a discharge end of the second metering belt; a discharge port of the reaction kettle is connected to a feed port of the mixing tank through a third pipeline; a third metering pump is arranged on the third pipeline; a discharge port of the mixing tank is successively connected to an upper-stage reactive extruder, a lower-stage reactive extruder, a granulator, a dryer, a cooling machine, a sieving machine, and a packaging machine through a fourth pipeline; a fourth metering pump is arranged on the fourth pipeline between the mixing tank and the upper-stage reactive extruder; a first mechanical stirring device and a heating device are arranged inside the reaction kettle; a second mechanical stirring device is arranged inside the mixing tank; a first control valve is provided at the discharge port of the reaction kettle, and a second control valve is provided at the discharge port of the mixing tank; and the sieving machine is connected to the second solid material storage tank through a fifth pipeline.

6. A method for industrialized continuous and simplified preparation of a urea-formaldehyde slow-release nitrogen fertilizer or a urea-formaldehyde-based slow-and controlled-release multi-nutrient fertilizer by using the device of claim 5, comprising:

(S1) feeding urea from the first solid material storage tank to the reaction kettle through the first metering belt; pumping formaldehyde from the first liquid material storage tank to the reaction kettle through the first metering pump, and pumping potassium hydroxide solution from the second liquid material storage tank to the reaction kettle through the second metering pump to form a reaction system with a preset pH value, followed by stirring to obtain a hydroxymethylurea solution;

(S2) opening the first control valve arranged on the bottom of the reaction kettle;

pumping the hydroxymethylurea solution obtained in step (S1) to the mixing tank and feeding a modifier from the second solid material storage tank through the second metering belt to the mixing tank, followed by uniform mixing to obtain a reaction mixture;

(S3) pumping the reaction mixture obtained in step (S2) to a feeding assembly of the upper-stage reactive extruder through the third metering pump, followed by a reactive extrusion to produce a continuous urea-formaldehyde/modifier copolymer extrudate;

(S4) feeding the continuous urea-formaldehyde/modifier copolymer extrudate obtained in step (S3) to a feeding assembly of the lower-stage reactive extruder, followed by kneading, and extrusion from a die of the lower-stage reactive extruder to obtain a continuous strip-shaped product;

(S5) cutting the continuous strip-shaped product obtained in step (S4) into cylindrical granules by using the granulator;

(S6) drying the cylindrical granules obtained in step (S5) by using the dryer to obtain dried cylindrical granules;

(S7) cooling the dried cylindrical granules obtained in step (S6) by using the cooling machine;

(S8) grading cooled cylindrical granules obtained in step (S7) by using the sieving machine, wherein qualified cylindrical granules are fed to the packaging machine, and unqualified cylindrical granules are returned to the second solid material storage tank to undergo an extrusion and granulation process again; and (S9) packing the qualified cylindrical granules obtained in step (S8) by using the packaging machine to obtain the urea-formaldehyde slow-release nitrogen fertilizer or the urea-formaldehyde-based slow-and controlled-release multi-nutrient fertilizer.

7. The method of claim 6, wherein when the modifier in step (S2) is a natural polymer or a synthetic polymer capable of improving soil, the urea-formaldehyde slow-release nitrogen fertilizer is obtained; and when the modifier in step (S2) is a nutritious fertilizer, the urea-formaldehyde-based slow-and controlled-release multi-nutrient fertilizer is obtained, wherein the nutritious fertilizer is free of nitrogen or comprises nitrogen and other nutrient elements.

8. The method of claim 7, wherein the nutritious fertilizer is selected from the group consisting of a nitrogen fertilizer, a phosphate fertilizer, a potassium fertilizer, a secondary or micro-element fertilizer, and a combination thereof; the natural polymer is selected from the group consisting of starch, cellulose, chitosan, and a combination thereof; and the synthetic polymer is selected from the group consisting of polyacrylic acid, polyacrylamide, polyvinyl alcohol, and a combination thereof.

9. The method of claim 6, wherein in step (S1), a molar ratio of urea to formaldehyde is (4.0-1.0):1; the potassium hydroxide solution is added such that a reaction system in the reaction kettle has a pH of 7-10; and the stirring is performed at 20-80° C.

10. The method of claim 6, wherein in step (S2), a mass ratio of the hydroxymethylurea solution to the modifier is set such that the urea-formaldehyde/modifier copolymer extrudate extruded from the upper-stage reactive extruder is continuous.

11. The method of claim 6, wherein in step (S3), a preset temperature of the upper-stage reactive extruder is 50-200° C., and a preset screw speed of the upper-stage reactive extruder is A r/min, and $0 < A \leq 200$; and in step (S4), a preset temperature of the lower-stage reactive extruder is 20-200° C., and a preset screw speed of the lower-stage reactive extruder is B r/min, and $0 < B \leq 200$.

12. The method of claim 6, wherein in step (S5), the cylindrical granules have a length of 3-10 mm, and a diameter of 3-5 mm; and in step (S6), the drying is performed at 60-200° C.; and the drying is performed to reach a preset water content equal to or less than 5%.

* * * * *